July 12, 1966  H. STÄBLER  3,260,052
HYDRODYNAMIC COUPLING
Filed July 17, 1964
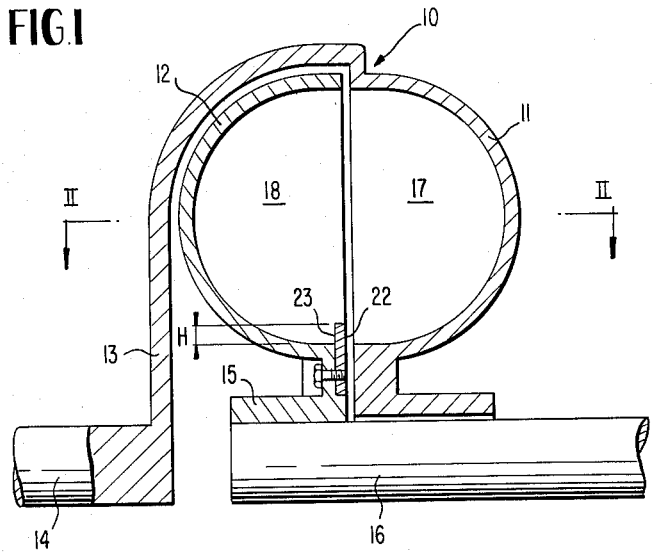
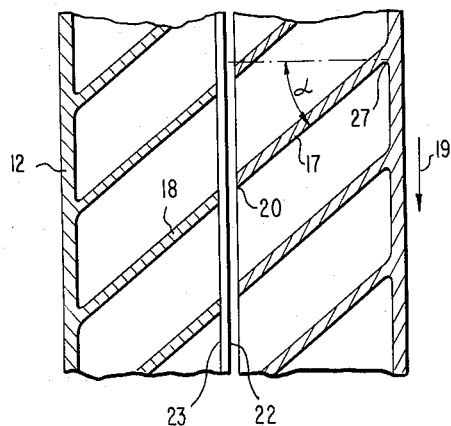
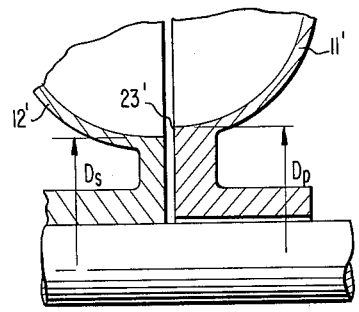
INVENTOR.
HEINZ STÄBLER
BY Dicke + Craig
ATTORNEYS

United States Patent Office 3,260,052
Patented July 12, 1966

3,260,052
HYDRODYNAMIC COUPLING
Heinz Städler, Steinenbronn, Germany, assignor to Daimler-Benz Aktiengesellschaft, Stuttgart-Unterturkheim, Germany
Filed July 17, 1964, Ser. No. 383,340
5 Claims. (Cl. 60—54)

The present invention relates to a hydrodynamic coupling for motor vehicles, consisting of a primary shell or impeller member operatively connected with the drive or input shaft and of a secondary shell or turbine member operatively connected with the output or driven shaft. The present invention has particular significance for so-called starting couplings, possibly also in connection with mechanical separating clutches or centrifugal clutches.

It is already known in the prior art to increase in hydrodynamic couplings the transmitting capacity in that the blades or vanes are inclined forwardly or curved forwardly in the direction of rotation at least at the primary shell or impeller. Furthermore, it is desirable with hydrodynamic couplings for motor vehicles to decrease the starting torque. It is thereby known for that purpose to insert into the hydraulic circuit impingement or deflector surfaces which are constructed for the most part in the form of separate baffle plates. Disadvantageous with these baffle plates, however, is the fact that they influence also the characteristic curve of the coupling in ranges other than the starting range, for example, in such ranges as have slight slippage, and this influence becomes noticeable in a disturbing manner, particularly with large baffle plates.

The present invention aims at eliminating the aforementioned disadvantages. It solves this task and the underlying problems with the aforementioned couplings used in motor vehicles in that both features, each known per se, are combined, which means therefore that at least the primary shell or impeller is provided with forwardly inclined or forwardly bent blades or vanes and a deflector or impingement surface is arranged in the part of the flow circulation disposed closest to the main axis of rotation which surface extends into this part of the flow circulation of the hydrodynamic coupling.

It has been discovered that with the construction according to the present invention already very small impingement or deflector surfaces have an unexpectedly high influence on the characteristic curve of the coupling during large slippage, however, without the occurrence of the aforementioned feared disadvantages in other ranges, especially with slight slippage. The advantageous effect takes place in particular with large angles of inclination, for example, with those over 45°. The present invention thus teaches the general concept that the impingement or deflector surfaces, with all conditions otherwise remaining the same, may be the smaller the larger the angle of inclination.

Different possibilities exist for the actual construction of the impingement or deflector surfaces themselves, which may be known, per se, in the prior art. Thus, for example, a baffle plate or disk secured at one of the two shells may serve as impingement or deflector surface. Another possibility essentially consists in that one of the two shells has a larger inner diameter than the other and that it serves with this relatively diametrically larger part of its end face itself as impingement or deflector surface.

Accordingly, it is an object of the present invention to provide a hydrodynamic coupling which obviates the aforementioned shortcomings and drawbacks encountered with the prior art constructions in an effective manner and by simple means.

Another object of the present invention resides in the provision of a hydrodynamic coupling which permits a reduction of the starting torque yet obviates the disadvantages normally encountered under low slippage operation with the insertion of deflector or impingement surfaces into the hydraulic flow circuit of the coupling.

A still further object of the present invention resides in the provision of a hydrodynamic coupling which exhibits an increased transmission capability combined with a reduced starting torque yet eliminates the drawback of affecting the characteristics of the coupling within operating ranges other than the starting range.

These and further objects, features and advantages of the present invention will become more obvious from the follow description when taken in connection with the accompanying drawing which shows, for purposes of illustration only, two embodiments in accordance with the present invention, and wherein—

FIGURE 1 is a partial axial cross-sectional view through a hydrodynamic coupling in accordance with the present invention, FIGURE 2 is a partial cross-sectional view taken along line II—II of FIGURE 1 and FIGURE 3 is a partial axial cross-sectional view through a modified embodiment of a coupling in accordance with the present invention.

Referring now to the drawing wherein like reference numerals are used throughout the various views to designate corresponding parts, and more particularly to FIGURES 1 and 2, the hydrodynamic coupling illustrated therein is generally designated by reference numeral 10 and consists of a primary shell or impeller 11 and of a secondary shell or turbine 12. The primary shell 11 is arranged on the side facing the output of the coupling and is connected with the drive or input shaft 14 by means of a housing part 13 surrounding the secondary shell 12. The secondary shell 12 is secured with the hub portion 15 thereof onto the output shaft 16. The primary shell 11 is sealed and possibly supported in any conventional known manner with respect to the output shaft 16. The output shaft 16 and/or the hub portion 15 may also be supported within the drive shaft 14 and/or the housing part 13.

According to FIGURE 2, the blades or vanes 17 of the primary shell 11 are inclined by a predetermined angle $\alpha$ in the forward direction of rotation indicated by the arrow 19. This means that the blade edge 20 is disposed ahead of the blade bottom or blade base 21 in the direction of arrow 19. The blades 18 of the secondary shell 12 have the same inclination $\alpha$, this means that they form, in the cross-sectional view of FIGURE 2, the extension of the blades 17, so to speak.

A baffle plate 22 is secured on the secondary shell 12 at the hub portion 15 thereof. The disk-like baffle plate 22 extends into the inner cross-over area of the hydraulic circuit and forms with the annular surface 23 thereof a baffle means comprising an impingement or deflector surface for the hydraulic flow. The height H of this annularly-shaped impingement or deflector surface 23 amounts only to a slight fraction of the shell diameter. The height H may be the smaller, the larger the angle of inclination $\alpha$. The baffle plate 22 may, of course, also be arranged and secured at the primary shell 11.

During starting, that means with a 100 percent slippage, the flow of the hydraulic medium of the coupling impinges against the impingement surface 23 of the baffle plate 22. The flow is thereby disturbed and as a result thereof, the starting torque of the coupling 10 is considerably reduced. With decreasing slippage the flow is displaced into the outer region of the coupling 10 by reason of the increasing centrifugal force within the coupling shells 11 and 12 so that the flow of the hydraulic medium no longer contacts the impingement or deflector surface 23. Consequently, the impingement or deflector surface 23 has with a decreasing slippage no or at least approximately no influence any longer on the shape of the characteristic curve of the coupling. Since the height H according to the present invention is only relatively small, the influence thereof stops already soon after the starting.

According to FIGURE 3 the arrangement of the two shells 11' and 12' is in principle the same as described in connection with the embodiment of FIGURES 1 and 2. However, the inner diameter $D_P$ of the primary shell 11' is larger than the inner diameter $D_S$ of the secondary shell 12'. In this manner the primary shell 11' forms with the end face thereof a baffle means comprising an impingement or deflector surface 23' which produces the same effect as described hereinabove.

While I have shown and described two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:
1. A hydrodynamic coupling for motor vehicles, comprising:
   primary means including a first rotary semi-toroidal shell provided with blade means,
   secondary means including a second rotary semi-toroidal shell provided with blade means,
   said first and second shells being positioned mutually adjacent and in a mutually facing relationship to form a toroidal work circuit about a common axis of rotation, said work circuit comprising an inner cross-over area, said area being nearest said common axis of rotation, each of the said blade means comprising substantially semi-circular blades having bases and having radially extending edges disposed oppositely to said bases,
   said edges of the blades of said first semi-toroidal shell being disposed ahead of the bases thereof in the forward direction of rotation to thereby form an angle of inclination of said last named blades,
   and further means effectively forming baffle means within said area extending radially outward from said common axis of rotation,
   the distance said baffle means extends radially outward and the extent of said angle of inclination being mutually related,
   said distance being the smaller the larger the angle of inclination of said last-named blades.

2. A hydrodynamic coupling for motor vehicles, comprising:
   primary means including a first rotary semi-toroidal shell provided with blade means,
   secondary means including a second rotary semi-toroidal shell provided with blade means,
   said first and second shells being positioned mutually adjacent and in a mutually facing relationship to form a toroidal work circuit about a common axis of rotation, said work circuit comprising an inner cross-over area, said area being nearest said common axis of rotation, each of the said blade means comprising substantially semi-circular blades having bases and having radially extending edges disposed oppositely to said bases,
   said edges of the blades of said first semi-toroidal shell being disposed ahead of the bases thereof in the forward direction of the rotation to thereby form an angle of inclination of said last named blades,
   and further means effectively forming baffle means within said area extending radially outward from said common axis of rotation thereof,
   the distance said baffle means extends radially outward and the extent of said angle of inclination being mutually related,
   said baffle means being constituted by baffle plate means secured to one of said semi-toroidal shells,
   said distance being the smaller the larger the angle of inclination of the blade means.

3. A hydrodynamic coupling for motor vehicles, comprising:
   primary means including a first rotary semi-toroidal shell provided with blade means,
   said first and second shells being positioned mutually adjacent and in a mutually facing relationship to form a toroidal work circuit about a common axis of rotation, said work circuit comprising an inner cross-over area, said area being nearest said common axis of rotation, each of the said blade means comprising substantially semi-circular blades having radially extending edges disposed oppositely to said bases,
   said edges of the blades of said first semi-toroidal shell being disposed ahead of the bases thereof in the forward direction of the rotation to thereby form an agle of inclination of said last-named blades,
   and further means effectively forming baffle means within said area extending radially outward from said common axis of rotation,
   the distance said baffle means extends radially outward and the extent of said angle of inclination being mutually related,
   one of said semi-toroidal shells having a larger inner diameter than the other and itself forming with the part of the end face thereof the said further means,
   said distance being the smaller the larger the angle of inclination of the blade means.

4. A hydrodynamic coupling for motor vehicles having a drive shaft and an output shaft, comprising:
   primary means including a first rotary semi-toroidal shell provided with blade means adapted to be connected with the drive shaft,
   secondary means including a second rotary semi-toroidal shell provided with blade means and adapted to be connected with the output shaft,
   the said first and second shells being positioned mutually adjacent and in a mutually facing relationship to form a toroidal work circuit about a common axis of rotation, said work circuit comprising an inner cross-over area, said area being nearest said common axis of rotation, each of said blade means comprising substantially semi-circular blades having bases and having radially extending edges disposed oppositely to said bases, said edges of the blades of the said first semi-toroidal shell being disposed ahead of the bases thereof in the forward direction of rotation to thereby form an angle of inclination of said last-named blades,
   and means effectively forming baffle means within said area extending radially outward from said common axis of rotation,
   the distance said baffle means extends radially outward and the extent of said angle of inclination being mutually related in that said distance is inversely proportional to the extent of said angle of inclination.

5. A hydrodynamic coupling, comprising:
   primary means including a first rotary semi-toroidal shell provided with primary blade means,
   secondary means including the second rotary semi-toroidal shell provided with secondary blade means,
   said first and second shells being positioned mutually adjacent and in a mutually facing relationship to form a toroidal work circuit about a common axis of rotation, said work circuit comprising an inner cross-over area, said area being nearest said common axis of rotation, each of said blade means comprising substantially semi-circular blades having bases and having radially extending edges disposed oppositely to said bases, said edges of the blades of said first semi-toroidal shell being disposed ahead of the bases thereof in the forward direction of rotation to thereby form an angle of inclination of said last named blades, further means effectively forming baffle means within said area extending radially outward from said common axis of rotation, and means for increasing the transmitting capacity of said coupling and for reducing the starting torque of said coupling substantially without affecting the torque characteristics thereof in operating ranges other than the starting range, said last-mentioned means being constituted by said last named blades and by said baffle means, the distance said baffle means extends radially outward being inversely proportional to the extent of said angle of inclination.

References Cited by the Examiner
UNITED STATES PATENTS

| | | | |
|---|---|---|---|
| 1,784,212 | 12/1930 | Walker | 60—54 |
| 1,822,555 | 9/1931 | Weiss. | |
| 2,181,711 | 11/1939 | Sinclair | 60—54 |
| 2,301,645 | 10/1942 | Sinclair | 60—54 |

FOREIGN PATENTS 825,619   12/1959   Great Britain.

JULIUS E. WEST, *Primary Examiner.*